(12) United States Patent
Kang et al.

(10) Patent No.: US 11,365,269 B2
(45) Date of Patent: Jun. 21, 2022

(54) MODIFIER, MODIFIED AND CONJUGATED DIENE-BASED POLYMER AND RUBBER COMPOSITION INCLUDING THE SAME

(71) Applicant: LG Chem, Ltd., Seoul (KR)

(72) Inventors: Suk Youn Kang, Daejeon (KR); Hyo Jin Bae, Daejeon (KR); Hee Jung Jeon, Daejeon (KR); Jeong Heon Ahn, Daejeon (KR); Heung Yeal Choi, Daejeon (KR); Kyoung Hwan Oh, Daejeon (KR); Woo Jin Cho, Daejeon (KR)

(73) Assignee: LG Chem, Ltd.

( * ) Notice: Subject to any disclaimer, the term of this patent is extended or adjusted under 35 U.S.C. 154(b) by 285 days.

(21) Appl. No.: 16/871,768

(22) Filed: May 11, 2020

(65) Prior Publication Data

US 2020/0270378 A1    Aug. 27, 2020

Related U.S. Application Data

(62) Division of application No. 15/770,902, filed as application No. PCT/KR2017/006995 on Jun. 30, 2017, now abandoned.

(30) Foreign Application Priority Data

Jul. 4, 2016   (KR) .................. 10-2016-0084112
Oct. 31, 2016   (KR) .................. 10-2016-0143545

(51) Int. Cl.
| | |
|---|---|
| C08F 36/04 | (2006.01) |
| C08C 19/22 | (2006.01) |
| C07F 7/10 | (2006.01) |
| C08C 19/25 | (2006.01) |
| C08L 15/00 | (2006.01) |
| C08C 19/44 | (2006.01) |
| C08K 3/06 | (2006.01) |
| C08K 5/09 | (2006.01) |
| C08F 4/54 | (2006.01) |
| C08K 5/47 | (2006.01) |
| C08K 5/31 | (2006.01) |
| C08K 3/04 | (2006.01) |
| C08K 3/22 | (2006.01) |
| C08F 136/06 | (2006.01) |
| C08F 2/06 | (2006.01) |
| C08L 91/00 | (2006.01) |
| C08K 5/3437 | (2006.01) |
| C08F 4/44 | (2006.01) |
| C08F 8/42 | (2006.01) |
| C08K 5/549 | (2006.01) |
| C08F 4/42 | (2006.01) |
| C08F 236/08 | (2006.01) |
| C08L 9/00 | (2006.01) |
| C08K 5/3412 | (2006.01) |
| C08F 236/06 | (2006.01) |

(52) U.S. Cl.
CPC ............... *C08F 36/04* (2013.01); *C07F 7/10* (2013.01); *C08C 19/22* (2013.01); *C08C 19/25* (2013.01); *C08C 19/44* (2013.01); *C08F 2/06* (2013.01); *C08F 4/42* (2013.01); *C08F 4/44* (2013.01); *C08F 4/545* (2013.01); *C08F 8/42* (2013.01); *C08F 136/06* (2013.01); *C08F 236/08* (2013.01); *C08K 3/04* (2013.01); *C08K 3/06* (2013.01); *C08K 3/22* (2013.01); *C08K 5/09* (2013.01); *C08K 5/31* (2013.01); *C08K 5/3412* (2013.01); *C08K 5/3437* (2013.01); *C08K 5/47* (2013.01); *C08K 5/549* (2013.01); *C08L 9/00* (2013.01); *C08L 15/00* (2013.01); *C08L 91/00* (2013.01); *C08F 236/06* (2013.01); *C08F 2500/17* (2013.01); *C08K 2003/2296* (2013.01)

(58) Field of Classification Search
None
See application file for complete search history.

(56) References Cited

U.S. PATENT DOCUMENTS

| | | | |
|---|---|---|---|
| 5,077,387 A | 12/1991 | Jacquier et al. | |
| 5,736,617 A | 4/1998 | Kerns et al. | |
| 5,795,901 A | 8/1998 | Szczepanski | |
| 6,030,987 A | 2/2000 | Silverman et al. | |

(Continued)

FOREIGN PATENT DOCUMENTS

| | | |
|---|---|---|
| CN | 101835807 A | 9/2010 |
| CN | 102361887 A | 2/2012 |

(Continued)

OTHER PUBLICATIONS

Chinese Search Report for Application No. 201780004462.2 dated Dec. 30, 2019, 2 pages.

(Continued)

*Primary Examiner* — Satya B Sastri
(74) *Attorney, Agent, or Firm* — Lerner, David, Littenberg, Krumholz & Mentlik, LLP

(57) ABSTRACT

The present invention provides a modifier, a modified and conjugated diene-based polymer which is modified using the same, and a rubber composition including the modified and conjugated diene-based polymer, and more particularly, a modifier which includes a compound represented by Formula 1 and is capable of improving the mixing properties between a conjugated diene-based polymer and a filler, a modified and conjugated diene-based polymer which is modified using the same, and a rubber composition including the modified and conjugated diene-based polymer.

13 Claims, No Drawings

(56) References Cited

U.S. PATENT DOCUMENTS

| | | | |
|---|---|---|---|
| 7,452,414 B1 | 11/2008 | Jung et al. | |
| 9,403,919 B2 * | 8/2016 | Luo | C08F 236/10 |
| 11,041,025 B2 * | 6/2021 | Bae | C08F 136/06 |
| 11,186,661 B2 * | 11/2021 | Jeon | C08K 5/544 |
| 2006/0135701 A1 | 6/2006 | Lawson et al. | |
| 2008/0103261 A1 | 5/2008 | Tanaka et al. | |
| 2009/0163668 A1 * | 6/2009 | Yamada | C08C 19/44 |
| | | | 525/331.9 |
| 2010/0317818 A1 | 12/2010 | Hogan et al. | |
| 2011/0077325 A1 | 3/2011 | Luo | |
| 2012/0059112 A1 | 3/2012 | Luo et al. | |
| 2014/0309363 A1 * | 10/2014 | Morita | C08C 19/44 |
| | | | 526/194 |
| 2014/0357784 A1 * | 12/2014 | Morita | B60C 1/0041 |
| | | | 525/113 |
| 2016/0060368 A1 | 3/2016 | Doring et al. | |
| 2018/0312669 A1 | 11/2018 | Kang et al. | |

FOREIGN PATENT DOCUMENTS

| | | |
|---|---|---|
| CN | 102639568 A | 8/2012 |
| CN | 104718224 A | 6/2015 |
| EP | 2203482 B1 | 11/2015 |
| JP | H10195114 A | 7/1998 |
| JP | H11509524 A | 8/1999 |
| JP | 2003155381 A | 5/2003 |
| JP | 2005082735 A | 3/2005 |
| JP | 2007500281 A | 1/2007 |
| JP | 2008274067 A | 11/2008 |
| JP | 2008285558 A | 11/2008 |
| JP | 2012515838 A | 7/2012 |
| JP | 2013506740 A | 2/2013 |
| JP | 2013082771 A | 5/2013 |
| JP | 5340556 B2 | 11/2013 |
| JP | 2014058480 A | 4/2014 |
| JP | 2015529736 A | 10/2015 |
| JP | 2018536053 A | 12/2018 |
| KR | 20110119722 A | 11/2011 |
| KR | 20120088733 A | 8/2012 |
| KR | 101417165 B1 | 7/2014 |
| WO | 0050479 A1 | 8/2000 |
| WO | 2004111094 A1 | 12/2004 |
| WO | 2008156788 A2 | 12/2008 |
| WO | 2010085622 A2 | 7/2010 |

OTHER PUBLICATIONS

Search report from International Application No. PCT/KR2017/006995, dated Sep. 18, 2017.

Zasukha, S. V., et al., "The first synthesis of chiral dialkylamines with a,a-difluoroethers fragments." Journal of Fluorine Chemistry (Accepted Mar. 22, 2016; Available online Mar. 24, 2016), vol. 185, pp. 197-200.

Search report from International Application No. PCT/KR2017/006996, dated Sep. 18, 2017.

Ueda K, Hirao A, Nakahama S. Synthesis of polymers with amino end groups. 3. Reactions of anionic living polymers with a-halo-w-aminoalkanes with a protected amino functionality. Macromolecules. Jul. 1990;23(4):939-45. XP055533829.

Extended European Search Report including Written Opinion for EP17824467.9 dated Jan. 8, 2019.

Extended European Search Report including Written Opinion for EP17824468.7 dated Jan. 11, 2019.

* cited by examiner

MODIFIER, MODIFIED AND CONJUGATED DIENE-BASED POLYMER AND RUBBER COMPOSITION INCLUDING THE SAME

CROSS-REFERENCE TO RELATED APPLICATIONS

This application is a divisional of U.S. application Ser. No. 15/770,902 filed on Apr. 25, 2018, which is a national stage entry under 35 U.S.C. § 371 of International Application No. PCT/KR2017/006995, filed Jun. 30, 2017, which claims priority to Korean Patent Application Nos. 10-2016-0084112, filed Jul. 4, 2016, and 10-2016-0143545, filed Oct. 31, 2016, the disclosures of which are incorporated herein by reference in their entirety.

TECHNICAL FIELD

The present invention relates to a modifier used for the modification of a modified and conjugated diene-based polymer, and more particularly, to a modifier which has excellent affinity with a filler and may improve mixing properties of a conjugated diene-based polymer, a modified and conjugated diene-based polymer which is modified using the same, and a rubber composition including the modified and conjugated diene-based polymer.

BACKGROUND ART

With the growing concern of energy savings and environmental problems increases, the decrease of a fuel consumption ratio of an automobile is being required. As a method of fulfill the requirement, a method for decreasing exothermic properties of tires by using an inorganic filler such as silica and carbon black in a rubber composition for forming tires, has been suggested, but dispersion of the inorganic filler in the rubber composition was not easy and defects of degrading the physical properties of the rubber composition such as abrasion resistance, cracking resistance and processability were rather generated.

In order to solve such defects, a method for modifying a polymerization active part of a conjugated diene-based polymer which is obtained by anionic polymerization using an organolithium with a functional group which is capable of interacting with an inorganic filler has been developed as a method for increasing dispersibility of an inorganic filler such as silica and carbon black in a rubber composition. Particularly, a method for modifying a polymerization active terminal of a conjugated diene-based polymer using a tin-based compound, a method of introducing an amino group, or a modification method using an alkoxysilane derivative, etc., has been suggested.

However, if a rubber composition using a modified and conjugated diene-based polymer which has been modified by the above-described method is prepared, low exothermic properties may be secured, but effects of improving physical properties of the rubber composition such as abrasion resistance, processability, or the like are insufficient.

In another method, in a living polymer which is obtained via coordination polymerization using a catalyst including a lanthanide series rare earth element compound, a method for modifying a living active terminal by a specific coupling agent or a modifier has been developed. However, in a conventionally known catalyst including a lanthanide series rare earth element compound, the activity of the living terminal thus produced is weak, and the modification rate of the terminal is low, and the effects of improving the physical properties of the rubber composition is insignificant.

DISCLOSURE OF THE INVENTION

Technical Problem

The present invention has been devised in consideration of the above-mentioned problems, and an object of the present invention is to provide a modifier which has excellent affinity with a filler and is capable of improving the mixing properties of a conjugated diene-based polymer.

In addition, other objects of the present invention are to provide a modified and conjugated diene-based polymer which is modified by the modifier and has improved mixing properties between a polymer and a filler, and a method for preparing the same.

In addition, other objects of the present invention are to provide a rubber composition and a tire including the modified and conjugated diene-based polymer.

Technical Solution

To solve the above-described tasks, according to an embodiment of the present invention, there is provided a modifier including a compound represented by the following Formula 1:

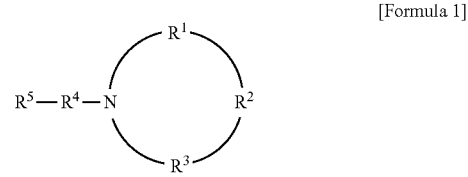

[Formula 1]

in Formula 1, $R^1$ to $R^3$ may be each independently a trivalent hydrocarbon group which is substituted with at least one substituent selected from the group consisting of a halogen group, an alkyl group of 1 to 20 carbon atoms, a cycloalkyl group of 3 to 20 carbon atoms, an aryl group of 6 to 30 carbon atoms, and —$R^6COOR^7$; or an unsubstituted divalent hydrocarbon group of 1 to 10 carbon atoms, where all $R^1$ to $R^3$ may not be the trivalent hydrocarbon group; or the divalent hydrocarbon group, at the same time, $R^4$ may be a single bond, an alkylene group of 1 to 20 carbon atoms, or a cycloalkylene group of 3 to 20 carbon atoms, $R^5$ may be a silyl group which is unsubstituted or substituted with an alkyl group of 1 to 20 carbon atoms; halogen; a cyano group; or —$COR^8$, $R^6$ may be a single bond, an alkylene group of 1 to 20 carbon atoms, or a cycloalkylene group of 3 to 20 carbon atoms, $R^7$ may be an alkyl group of 1 to 20 carbon atoms, or a cycloalkyl group of 3 to 20 carbon atoms, and $R^8$ may be one selected from the group consisting of an alkoxy group of 1 to 10 carbon atoms, an aryl group of 6 to 30 carbon atoms, a heteroaryl group of 2 to 30 carbon atoms, a heterocycloalkyl group of 2 to 10 carbon atoms, a heteroamine group of 2 to 10 carbon atoms and a disilylamino group of 3 to 10 carbon atoms.

In addition, according to other embodiments of the present invention, there are provided a modified and conjugated diene-based polymer including a functional group derived from the modifier, and a method for preparing the same.

Further, according to other embodiments of the present invention, there are provided a rubber composition and a tire including the modified and conjugated diene-based polymer.

Advantageous Effects

According to the present invention, a modifier which has excellent affinity with a filler and is capable of improving mixing properties of a conjugated diene-based polymer is provided, and further, a modified and conjugated diene-based polymer which is modified by the modifier and has improved mixing properties between a polymer and a filler, a method for preparing the same, and a tire including the same, are provided.

BEST MODE FOR CARRYING OUT THE INVENTION

Hereinafter, the present invention will be described in more detail to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The modifier according to an embodiment the present invention may include a compound represented by the following Formula 1:

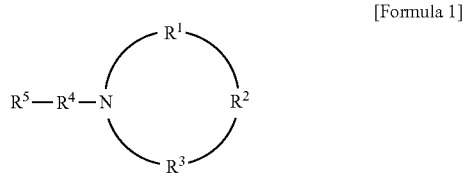

[Formula 1]

in Formula 1, $R^1$ to $R^3$ may be each independently a trivalent hydrocarbon group which is substituted with at least one substituent selected from the group consisting of a halogen group, an alkyl group of 1 to 20 carbon atoms, a cycloalkyl group of 3 to 20 carbon atoms, an aryl group of 6 to 30 carbon atoms, and —$R^6COOR^7$; or an unsubstituted divalent hydrocarbon group of 1 to 10 carbon atoms, where all $R^1$ to $R^3$ may not be the trivalent hydrocarbon group; or the divalent hydrocarbon group, at the same time, $R^4$ may be a single bond, an alkylene group of 1 to 20 carbon atoms, or a cycloalkylene group of 3 to 20 carbon atoms, $R^5$ may be a silyl group which is unsubstituted or substituted with an alkyl group of 1 to 20 carbon atoms; halogen; a cyano group; or —$COR^8$, $R^6$ may be a single bond, an alkylene group of 1 to 20 carbon atoms, or a cycloalkylene group of 3 to 20 carbon atoms, $R^7$ may be an alkyl group of 1 to 20 carbon atoms, or a cycloalkyl group of 3 to 20 carbon atoms, and $R^8$ may be one selected from the group consisting of an alkoxy group of 1 to 10 carbon atoms, an aryl group of 6 to 30 carbon atoms, a heteroaryl group of 2 to 30 carbon atoms, a heterocycloalkyl group of 2 to 10 carbon atoms, a heteroamine group of 2 to 10 carbon atoms and a disilylamino group of 3 to 10 carbon atoms.

Unless otherwise defined in the present invention, "trivalent hydrocarbon group which is substituted with a substituent" may mean a hydrocarbon group which is substituted with total trivalence from a bond (divalence) in an N atom-containing ring and a bond (monovalence) with the defined substituent, or the substituted trivalent hydrocarbon group may be a trivalent hydrocarbon group of 1 to 10, or 1 to 5 carbon atoms which form a ring together with an N atom, excluding the carbon number of the defined substituent.

In addition, unless otherwise defined in the present invention, "single bond" may mean a single covalent bond itself, which does not include a separate atom or molecular group.

In addition, unless otherwise defined in the present invention, "silyl group unsubstituted or substituted with an alkyl group of 1 to 20 carbon atoms" may mean one selected from the group consisting of an unsubstituted monovalent silyl group and di- to tetra-valent silyl group substituted with the alkyl group.

The modifier according to the present invention may be the compound represented by Formula 1 itself, or may include another compound which may modify a conjugated diene-based polymer together with the compound represented by Formula 1.

In addition, the modifier according to the present invention includes a cyclized tertiary amine derivative as the compound represented by Formula 1, and in a conjugated diene-based polymer, particularly, a conjugated diene-based polymer having an active organometal part, the modifier may modify the conjugated diene-based polymer by imparting a conjugated diene-based polymer with a functional group via a substitution or addition reaction with the active organometal part.

Meanwhile, the modifier according to an embodiment of the present invention includes a functional group which is capable of improving affinity with a filler in a molecule, and mixing properties between a polymer and a filler may be improved. Further, by including a cyclized tertiary amine derivative as described above, the modifier may prevent the agglomeration between fillers in a rubber composition and may improve the dispersibility of a filler. In an embodiment, if silica which is a kind of an inorganic filler is used as a filler, agglomeration may be easily arise between hydroxide groups present on the surface of the silica due to a hydrogen bond, but the cyclized tertiary amino group may inhibit the hydrogen bond between hydroxide groups of the silica, thereby improving the dispersibility of the silica. As described above, the modifier has a structure which may maximize the mixing properties of a modified and conjugated diene-based polymer, and a modified and conjugated diene-based polymer having excellent balance of mechanical properties of a rubber composition such as abrasion resistance and processability may be efficiently prepared.

According to an embodiment of the present invention, in Formula 1, $R^1$ to $R^3$ may be each independently a trivalent hydrocarbon group which is substituted with —$R^6COOR^7$; or an unsubstituted divalent hydrocarbon group of 1 to 10 carbon atoms, where all $R^1$ to $R^3$ may not be the trivalent hydrocarbon group; or the divalent hydrocarbon group, at the same time, $R^4$ may be a single bond, or an alkylene group of 1 to 20 carbon atoms, $R^5$ may be a silyl group which is substituted with an alkyl group of 1 to 20 carbon atoms; halogen; a cyano group; or —$COR^8$, $R^6$ may be a single bond, $R^7$ may be an alkyl group of 1 to 20 carbon atoms, and $R^8$ may be one selected from the group consisting of an alkoxy group of 1 to 10 carbon atoms, an aryl group of 6 to 30 carbon atoms, a heteroaryl group of 2 to 30 carbon atoms, a heterocycloalkyl group of 2 to 10 carbon atoms, a heteroamine group of 2 to 10 carbon atoms, and a disilylamino group of 3 to 10 carbon atoms.

According to an embodiment of the present invention, the compound represented by Formula 1 may be a compound represented by the following Formula 2:

[Formula 2]

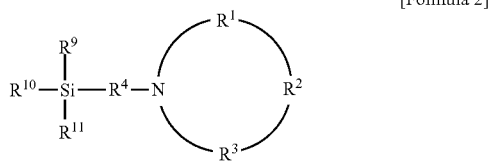

in Formula 2, $R^1$ and $R^3$ may be each independently a trivalent hydrocarbon group which is substituted with at least one substituent selected from the group consisting of a halogen group, an alkyl group of 1 to 20 carbon atoms, a cycloalkyl group of 3 to 20 carbon atoms, and an aryl group of 6 to 30 carbon atoms; or an unsubstituted divalent hydrocarbon group of 1 to 10 carbon atoms, $R^2$ may be a trivalent hydrocarbon group which is substituted with —$R^6COOR^7$, $R^4$ and $R^6$ may be single bonds, $R^7$ may be an alkyl group of 1 to 20 carbon atoms, or a cycloalkyl group of 3 to 20 carbon atoms, and $R^9$ to $R^{11}$ may be each independently hydrogen, or an alkyl group of 1 to 20 carbon atoms.

In another embodiment, in Formula 2, $R^1$ and $R^3$ may be each independently an unsubstituted divalent hydrocarbon group of 1 to 10 carbon atoms, $R^2$ may be a trivalent hydrocarbon group which is substituted with —$R^6COOR^7$, $R^4$ and $R^6$ may be single bonds, $R^7$ may be an alkyl group of 1 to 20 carbon atoms, and $R^9$ to $R^{11}$ may be each independently an alkyl group of 1 to 20 carbon atoms.

In a particular embodiment, the compound represented by Formula 2 may be one selected from the group consisting of the compounds represented by the following Formulae 2-1 to 2-3:

[Formula 2-1]

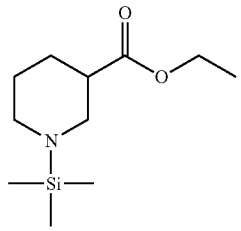

[Formula 2-2]

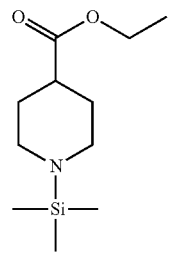

[Formula 2-3]

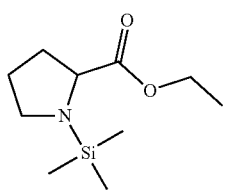

The modified and conjugated diene-based polymer according to an embodiment of the present invention may include a functional group derived from the modifier. Particularly, the modified and conjugated diene-based polymer may be prepared by modifying a conjugated diene-based polymer with the modifier.

The conjugated diene-based polymer may be a butadiene homopolymer such as polybutadiene, or a butadiene copolymer such as a butadiene-isoprene copolymer.

In a particular embodiment, the conjugated diene-based polymer may include from 80 to 100 wt % of a 1,3-butadiene monomer derived repeating unit, and selectively 20 wt % or less of other conjugated diene-based monomer derived repeating unit which is copolymerizable with 1,3-butadiene. Within the ranges, effects of not degrading the content of 1,4-cis bonds in a polymer may be attained. In this case, the 1,3-butadiene monomer may include 1,3-butadiene or the derivatives thereof such as 1,3-butadiene, 2,3-dimethyl-1,3-butadiene, and 2-ethyl-1,3-butadiene, and the other conjugated diene-based monomer which is copolymerizable with 1,3-butadiene may include 2-methyl-1,3-pentadiene, 1,3-pentadiene, 3-methyl-1,3-pentadiene, 4-methyl-1,3-pentadiene, 1,3-hexadiene, 2,4-hexadiene, or the like, where one or a compound of at least two thereof may be used.

According to an embodiment of the present invention, the conjugated diene-based polymer may be a conjugated diene-based polymer including an organometal part, which is derived from a catalyst composition including a lanthanide series rare earth element-containing compound, that is, activated from a catalyst, particularly, a neodymium catalyzed butadiene-based polymer including a 1,3-butadiene monomer derived repeating unit.

In the present invention, the activated organometal part of the conjugated diene-based polymer may be an activated organometal part at the terminal of the conjugated diene-based polymer (activated organometal part at the terminal of a molecular chain), an activated organometal part in a main chain, or an activated organometal part in a side chain. Among them, in case of obtaining an activated organometal part of the conjugated diene-based polymer by anionic polymerization or coordination anionic polymerization, the activated organometal part may be a terminal activated organometal part.

In addition, the modified and conjugated diene-based polymer according to an embodiment of the present invention may have optimized properties of molecular weight distribution, mooney viscosity, etc. to improve the balance of physical properties of a rubber composition, including viscoelasticity, tensile properties and processability via the control of the conditions of a catalyst composition, polymerization, etc. during the preparation thereof.

Particularly, the modified and conjugated diene-based polymer may have narrow molecular weight distribution (Mw/Mn) of 2.0 to 3.5. If applied to a rubber composition within this range, effects of improving tensile properties and viscoelasticity may be achieved. The molecular weight distribution may be, for example, from 2.5 to 3.5, from 2.5 to 3.2, or from 2.6 to 3.0.

In the present invention, the molecular weight distribution of a modified and conjugated diene-based polymer may be calculated from a ratio (Mw/Mn) of a weight average molecular weight (Mw) to a number average molecular weight (Mn). In this case, the number average molecular weight (Mn) is a common average of an individual polymer molecular weight, which is obtained by measuring the molecular weights of n polymer molecules, obtaining the total of the molecular weights and dividing the total by n.

The weight average molecular weight (Mw) shows molecular weight distribution of a polymer composition. All molecular weight average values may be expressed by gram per mol (g/mol). In addition, each of the weight average molecular weight and the number average molecular weight may mean a polystyrene converted molecular weight analyzed by gel permeation chromatography (GPC).

The modified and conjugated diene-based polymer according to an embodiment of the present invention may satisfy the above-described molecular weight distribution conditions, and at the same time, may have a weight average molecular weight (Mw) of $3 \times 10^5$ to $1.5 \times 10^6$ g/mol, and a number average molecular weight (Mn) of $1.0 \times 10^5$ to $5.0 \times 10^5$ g/mol. If applied to a rubber composition within the ranges, tensile properties may be excellent and processability may be good, and workability of the rubber composition may be improved and mulling and kneading may become easy, thereby achieving excellent mechanical properties and excellent balance of the physical properties of the rubber composition. The weight average molecular weight may be, for example, from $5 \times 10^5$ to $1.2 \times 10^6$ g/mol, or from $5 \times 10^5$ to $8 \times 10^5$ g/mol, and the number average molecular weight may be, for example, from $1.5 \times 10^5$ to $3.5 \times 10^5$ g/mol, or from $2.0 \times 10^5$ to $2.7 \times 10^5$ g/mol.

More particularly, if the modified and conjugated diene-based polymer according to an embodiment of the present invention satisfies the conditions of the molecular weight distribution together with the weight average molecular weight (Mw) and the number average molecular weight at the same time, and when applied to a rubber composition, tensile properties, viscoelasticity and processability of the rubber composition may be excellent, and the balance between the physical properties may be excellent.

In addition, the modified and conjugated diene-based polymer according to an embodiment of the present invention may have mooney viscosity (MV) of 20 to 70 at 100° C. With the mooney viscosity in the range, even better processability may be attained. The mooney viscosity at 100° C. may be, for example, from 40 to 70, from 40 to 65, or from 42 to 55.

In the present invention, the mooney viscosity may be measured by using a mooney viscometer, for example, MV2000E of Monsanto Co., Ltd. using Large Rotor at a rotor speed of 2±0.02 rpm at 100° C. In this case, a specimen used was stood at room temperature (23±3° C.) for 30 minutes or more, and 27±3 g of the specimen was collected and put in a die cavity, and then, Platen was operated for measurement.

The modified and conjugated diene-based polymer according to an embodiment of the present invention may be prepared by a preparation method including a modification step of reacting a conjugated diene-based polymer including an organometal part from activated from a lanthanide series rare earth element catalyst composition with a modifier including a compound represented by Formula 1.

In a particular embodiment, in order to react the activated organometal part of the conjugated diene-based polymer with the modifier for the preparation of the modified and conjugated diene-based polymer, the conjugated diene-based polymer used may preferably have living properties or pseudo living properties. Coordination anionic polymerization may be used as the polymerization reaction of the polymer having such living properties.

According to an embodiment of the present invention, the method for preparing a modified and conjugated diene-based polymer may further include a step of preparing a conjugated diene-based polymer having an activated organometal part via polymerization reaction of conjugated diene-based monomers in a polymerization solvent using a catalyst composition including a lanthanide series rare earth element-containing compound prior to the modification step.

In the catalyst composition, the lanthanide series rare earth element-containing compound may be a compound including one or two or more elements among the rare earth elements having atomic number of 57 to 71 in the periodic table such as neodymium, praseodymium, cerium, lanthanum and gadolinium, particularly, a compound including neodymium.

In another embodiment, the lanthanide series rare earth element-containing compound may be a salt which is soluble in a hydrocarbon solvent, such as the carboxylate, alkoxide, β-diketone complex, phosphate and phosphite of the lanthanide series rare earth element, particularly, a neodymium-containing carboxylate.

The hydrocarbon solvent may be a saturated aliphatic hydrocarbon of 4 to 10 carbon atoms including butane, pentane, hexane, heptane, etc.; a saturated alicyclic hydrocarbon of 5 to 20 carbon atoms including cyclopentane, cyclohexane, etc.; an aromatic hydrocarbon including mono-olefins such as 1-butene and 2-butene, benzene, toluene, xylene, etc.; or a halogenated hydrocarbon including methylene chloride, chloroform, trichloroethylene, perchloroethylene, 1,2-dichloroethane, chlorobenzene, bromobenzene, chlorotoluene, etc.

According to an embodiment of the present invention, the lanthanide series rare earth element-containing compound may include a neodymium compound represented by the following Formula 3:

[Formula 3]

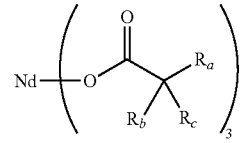

in Formula 3, $R_a$ to $R_c$ are each independently hydrogen, or an alkyl group of 1 to 12 carbon atoms, where all $R_a$ to $R_c$ are not hydrogen at the same time.

In a particular embodiment, the neodymium compound may be at least one selected from the group consisting of Nd(neodecanoate)$_3$, Nd(2-ethylhexanoate)$_3$, Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2-t-butyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$, and Nd(2-ethyl-2-hexyl nonanoate)$_3$.

In another embodiment, the lanthanide series rare earth element-containing compound may particularly be a neodymium compound of Formula 3 wherein $R_a$ is a linear or branched alkyl group of 4 to 12 carbon atoms, $R_b$ and $R_c$ are each independently hydrogen or an alkyl group of 2 to 8 carbon atoms, where both $R_b$ and $R_c$ are not hydrogen at the same time, in consideration of excellent solubility in a polymerization solvent without fear of oligomerization, conversion ratio into a catalyst active species, and consequent improving effects of catalyst activity.

In a more particular embodiment, in Formula 3, $R_a$ may be a linear or branched alkyl group of 6 to 8 carbon atoms, $R_b$ and $R_c$ may be each independently hydrogen or an alkyl group of 2 to 6 carbon atoms, where $R_b$ and $R_c$ may not be hydrogen at the same time, and particularly embodiments may include at least one selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2-t-butyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$, and Nd(2-ethyl-2-hexyl nonanoate)$_3$. Among the compounds, the neodymium compound may be at least one selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, and Nd(2,2-dioctyl decanoate)$_3$.

More particularly, in Formula 3, $R_a$ may be a linear or branched alkyl group of 6 to 8 carbon atoms, and $R_b$ and $R_c$ may be each independently an alkyl group of 2 to 6 carbon atoms.

As described above, the neodymium compound represented by Formula 3 includes a carboxylate ligand including an alkyl group with various lengths with 2 or more carbon atoms as a substituent at an α-position and may induce steric change around a neodymium central metal to block tangling phenomenon between compounds, thereby achieving the effects of restraining oligomerization. In addition, such neodymium compound has high solubility with respect to a polymerization solvent and decreases the ratio of neodymium which has difficulty in converting into a catalyst active species and is positioned at the central part, thereby achieving the effects of a high conversion ratio into a catalyst active species.

In another embodiment, the weight average molecular weight (Mw) of the neodymium compound represented by Formula 3 may be from 600 to 2,000 g/mol. With the weight average molecular weight in the range, excellent catalyst activity may be shown stably.

In addition, the solubility of the lanthanide series rare earth element-containing compound may be, for example about 4 g or more with respect to 6 g of a nonpolar solvent at room temperature (25° C.). In the present invention, the solubility of the neodymium compound means the degree of clear dissolution without turbidity, and such high solubility may serve excellent catalyst activity.

The lanthanide series rare earth element-containing compound may be used, for example, in an amount of 0.1 to 0.5 mmol, more particularly, 0.1 to 0.2 mmol based on 100 g of the conjugated diene-based monomer. Within this range, catalyst activity is high, an appropriate catalyst concentration is obtained, and effects of omitting a deliming process are attained.

The lanthanide series rare earth element-containing compound may be used, for example, as a reactant type with a Lewis base. The reactant improves the solubility with respect to the solvent of the lanthanide series rare earth element-containing compound by the Lewis base and gives effects of storing stably for a long time. The Lewis base may be used, for example, in a ratio of 30 mol or less, or 1 to 10 mol based on 1 mol of the rare earth element. The Lewis base may be, for example, acetylacetone, tetrahydrofuran, pyridine, N,N-dimethylformamide, thiophene, diphenyl ether, triethylamine, an organophosphorous compound, or monohydric or dihydric alcohol.

The catalyst composition may include, for example, a lanthanide series rare earth element-containing compound, an alkylating agent and a halogen compound.

The alkylating agent may play the role of a co-catalyst as an organometal compound which may transport a hydrocarbyl group to other metal, particularly, may be an organometal compound which is soluble in a nonpolar solvent and which contains a metal-carbon bond, such as an organoaluminum compound, an organomagnesium compound, an organolithium compound, etc.

The organoaluminum compound may be, for example, at least one selected from the group consisting of an alkylaluminum such as trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, and trioctylaluminum; a dihydrocarbylaluminum hydride such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydrogen; and a hydrocarbylaluminum dihydride such as ethylaluminum dihydride, n-propylaluminum dihydride, isopropylaluminum dihydride, n-butylaluminum dihydride, isobutylaluminum dihydride, and n-octylaluminum dihydride.

The organomagnesium compound may be, for example, an alkylmagnesium compound such as diethylmagnesium, di-n-propylmagnesium, diisopropylmagnesium, dibutylmagnesium, dihexylmagnesium, diphenylmagnesium and dibenzylmagnesium.

The organolithium compound may be, for example, an alkyllithium compound such as n-butyllithium.

The alkylating agent may use at least one selected from the group consisting of the organoaluminum compounds, the organomagnesium compounds and the organolithium compounds, particularly, diisobutylaluminum hydride (DIBAH) which may play the role of a molecular weight controlling agent during performing polymerization reaction. In another embodiment, the alkylating agent may be used in an amount of 1 to 100 mol, or 3 to 20 mol based on 1 mol of the lanthanide series rare earth element-containing compound.

The halogen compound may be at least one selected from the group consisting of an aluminum halogen compound; an inorganic halogen compound obtained by substituting aluminum in the aluminum halogen compound with boron, silicon, tin or titanium; and an organohalogen compound such as a t-alkylhalogen compound (alkyl of 4 to 20 carbon atoms).

Particular examples of the inorganic halogen compound may be at least one selected from the group consisting of dimethylaluminum chloride, diethylaluminumchloride (DEAC), dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride and tributyltin bromide.

In another embodiment, the organohalogen compound may be at least one selected from the group consisting of t-butyl chloride, t-butyl bromide, allyl chloride, allyl bromide, benzyl chloride, benzyl bromide, chloro-di-phenylmethane, bromo-di-phenylmethane, triphenylmethyl chloride, triphenylmethylbromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate and methyl bromoformate.

The halogen compound may be, for example, at least one selected from the group consisting of the inorganic halogen compounds and the organohalogen compounds, and in another embodiment, may be used in an amount of 1 to 20 mol, 1 to 5 mol, or 2 to 3 mol based on 1 mol of the lanthanide series rare earth element-containing compound.

In another embodiment, the alkylating agent and the halogen compound may include a lanthanide series rare earth element-containing compound which has been alkylated and chlorinated in advance, and in this case, a conversion ratio may be further improved.

According to an embodiment of the present invention, the catalyst composition may further include the conjugated diene-based monomer which is used in the present polymerization reaction.

As described above, if a portion of the conjugated diene-based monomer used in the present polymerization reaction is premixed with the catalyst composition and is used in a preforming catalyst composition type, catalyst activity may be improved, and further, the conjugated diene-based polymer thus prepared may be stabilized.

In the present invention, the term "preforming" may mean pre-polymerization in a catalyst system due to the addition of butadiene if a catalyst composition, that is, a catalyst system including a lanthanide series rare earth element-containing compound, an alkylating agent and a halogen compound includes diisobutylaluminum hydride (DIBAH), etc., and a small amount of a conjugated diene-based monomer such as butadiene is added to decrease the possibility of producing diverse catalyst active species with DIBAH. In addition, the term "premix" may mean a uniformly mixed state of each compound without performing polymerization in a catalyst system.

Particular examples of the conjugated diene monomer may be at least one selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene and 2,4-hexadiene. The amount of the conjugated diene-based monomer used for the preparation of the catalyst composition may be a portion within the total amount range used of the conjugated diene-based monomer used for the polymerization reaction, particularly, from 1 to 100 mol, from 10 to 50 mol, or from 20 to 40 mol based on 1 mol of the lanthanide series rare earth element-containing compound.

The above-described catalyst composition may be prepared, for example, by injecting the lanthanide series rare earth element-containing compound, the alkylating agent, the halogen compound, and selectively the conjugated diene-based monomer into an organic solvent one by one and mixing. In this case, the organic solvent may be a nonpolar solvent which has no reactivity with the constituent components of the catalyst composition. Particularly, the organic solvent may use at least one selected from the group consisting of an aliphatic hydrocarbon-based solvent such as pentane, hexane, isopentane, heptane, octane, and isooctane; a cycloaliphatic hydrocarbon-based solvent such as cyclopentane, methylcyclopentane, cyclohexane, methylcyclohexane, and ethylcyclohexane; and an aromatic hydrocarbon-based solvent such as benzene, toluene, ethylbenzene, and xylene. Particular example of the organic solvent may include an aliphatic hydrocarbon solvent such as hexane.

According to an embodiment of the present invention, the polymerization reaction of a conjugated diene-based polymer using the catalyst composition may be conducted by radical polymerization, particularly, bulk polymerization, solution polymerization, suspension polymerization, or emulsion polymerization, more particularly, solution polymerization. In another embodiment, the polymerization reaction may be conducted by any one of a batch type method or a continuous type method. In a particular embodiment, the polymerization reaction for preparing the conjugated diene-based polymer may be conducted by injecting a conjugated diene-based monomer to the catalyst composition and reacting in an organic solvent.

In another embodiment, the polymerization reaction for preparing the conjugated diene-based polymer may be conducted in an organic solvent. The organic solvent may be additionally added to the amount used for the preparation of the catalyst composition, and in this case, the organic solvent may be the same as that explained above. In addition, in case of using the organic solvent, the concentration of the monomer may be from 3 to 80 wt %, or from 10 to 30 wt %.

According to an embodiment of the present invention, additives including a reaction terminator for finishing polymerization reaction, such as polyoxyethylene glycol phosphate; and an antioxidant such as 2,6-di-t-butyl p-cresol may be further used during conducting polymerization reaction for preparing the conjugated diene-based polymer. Besides, additives for facilitating solution polymerization, particularly, a chelating agent, a dispersant, a pH controlling agent, a deoxidizer, or an oxygen scavenger may be selectively further used.

In another embodiment, the polymerization reaction for preparing the conjugated diene-based polymer may be conducted at 20 to 200° C., or 20 to 100° C. for 15 minutes to 3 hours, or 30 minutes to 2 hours. Within the ranges, the reaction may be easily controlled, the polymerization reaction rate and efficiency may be excellent, and the content of cis-1,4 bond of the conjugated diene-based polymer thus prepared may be high. In addition, the polymerization reaction for preparing the conjugated diene-based polymer may preferably avoid the inclusion of a compound having deactivation function, such as oxygen, water and carbon dioxide in a polymerization reaction system to prevent the deactivation of a catalyst composition including a lanthanide series rare earth element-containing compound and a polymer.

The polymerization reaction for preparing the conjugated diene-based polymer may be quenched by adding an isopropanol solution of 2,6-di-t-butyl-p-cresol (BHT), etc. to the polymerization reaction system. Then, desolvation treatment such as steam stripping for decreasing the partial pressure of solvents via supplying vapor, or a vacuum drying process may be selectively further conducted.

As a result of the polymerization reaction, a conjugated diene-based polymer including an organometal part which is activated from a catalyst including the lanthanide series rare earth element-containing compound, more particularly, a neodymium catalyzed conjugated diene-based polymer including a 1,3-butadiene monomer unit is produced, and the conjugated diene-based polymer thus prepared may have pseudo living properties.

Meanwhile, in the modification step in the preparation of the modified and conjugated diene-based polymer according to an embodiment of the present invention, the modifier is added in a stoichiometric quantity or more with respect to the active organometal part of the conjugated diene-based polymer to the conjugated diene-based polymer which is prepared by the above-described preparation process, to perform the reaction with the activated organometal part which is combined with the polymer. In this case, the modifier may be used in an amount of 0.1 to 20 mol, or 0.5 to 10 mol based on 1 mol of the lanthanide series rare earth element-containing compound used during preparing the conjugated diene-based polymer having the activated organometal part. The modification reaction may be, for example, conducted via solution reaction or solid reaction, particularly, solution reaction. In another embodiment, the modification reaction may be conducted by using a batch type reactor, or by a continuous type using a multi-step continuous type reactor or an in-line blender.

In another embodiment, the modification reaction may be performed in the same temperature and pressure conditions as those in a common polymerization reaction, and particularly, may be performed at a temperature of 20 to 100° C. Within this range, effects of not increasing the viscosity of the polymer and not deactivating the activated terminal of the polymer may be achieved.

The preparation method of the modified and conjugated diene-based polymer according to an embodiment of the present invention may further include precipitation and separation processes with respect to the modified and conjugated diene-based polymer thus prepared. Filtering, separating and drying processes with respect to the precipitated modified and conjugated diene-based polymer may follow common methods.

As described above, by the preparation method of the modified and conjugated diene-based polymer according to an embodiment of the present invention, a modified and conjugated diene-based polymer having narrow molecular weight distribution and excellent physical properties, particularly, a neodymium catalyzed butadiene-based polymer may be prepared.

The rubber composition according to an embodiment of the present invention may include the modified and conjugated diene-based polymer.

In a particular embodiment, the rubber composition may include the modified and conjugated diene-based polymer in an amount of 10 wt % or more, or 10 to 100 wt %, and within this range, the improving effects of excellent abrasion resistance, crack resistance and ozone resistance the rubber composition may be achieved.

In another embodiment, the rubber composition may further include a rubber component in an amount of 90 wt % or less based on the total weight of the rubber composition together with the modified and conjugated diene-based polymer. Specifically, the rubber composition may further include the rubber component in an amount of 1 to 900 parts by weight based on 100 parts by weight of the modified and conjugated diene-based copolymer.

The rubber component may be a natural rubber or a synthetic rubber, particularly, at least one selected from the group consisting of a natural rubber (NR) including cis-1, 4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, a halogenated butyl rubber.

In another embodiment, the rubber composition may further include 10 parts by weight or more, or 10 to 120 parts by weight of a filler based on 100 parts by weight of the modified and conjugated diene-based polymer.

The filler may particularly be silica, graphite or carbon black.

The silica may be, for example, wet silica (hydrated silicate), dry silica (anhydrous silicate), calcium silicate, aluminum silicate, or colloid silica. More particularly, the filler may be wet silica which has the most significant improving effects of destruction characteristics and compatible effects of wet grip characteristics, and in this case, a silane coupling agent may be used together for the improvement of reinforcing and low exothermic properties. The silane coupling agent may particularly include, for example, at least one selected from the group consisting of bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, and dimethoxymethylsilylpropylbenzothiazolyltetrasulfide, and more particularly, the silane coupling agent may be bis(3-triethoxysilylpropyl)polysulfide or 3-trimethoxysilylpropylbenzothiazyltetrasulfide in consideration of the improving effect of reinforcing properties.

The silane coupling agent may be used in an amount of 1 to 20 parts by weight, or 5 to 15 parts by weight based on 100 parts by weight of silica, and within this range, the effects of the coupling agent may be sufficiently shown, and the gelation of a rubber component may be prevented.

The carbon black may, for example, have a nitrogen adsorption specific surface area of 20 to 250 m²/g (measured based on N2SA, JIS K 6217-2:2001), and within this range, effects of excellent processability and reinforcing performance are achieved. In another embodiment, the carbon black may have a dibutylphthalate oil absorption (DBP) of 80 to 200 cc/100 g, and within this range, effects of excellent processability and reinforcing performance are achieved.

The filler may include an inorganic filler of at least one metal, metal oxide, or metal hydroxide selected from aluminum, magnesium, titanium, calcium and zirconium. Particular example of the inorganic filler may be at least one selected from the group consisting of γ-alumina, α-alumina, alumina-hydrate ($Al_2O_3.H_2O$), aluminum hydroxide [Al(OH)$_3$], aluminum carbonate [$Al_2(CO_3)_2$], magnesium hydroxide [Mg(OH)$_2$], magnesium oxide (MgO), magnesium carbonate (MgCO$_3$), talc ($3MgO.4SiO_2.H_2O$), attapulgite ($5Mg0.8SiO_2.9H_2O$), titanium white (TiO$_2$), titanium black, calcium oxide (CaO), calcium hydroxide [Ca(OH)$_2$], magnesium aluminate (MgO.Al$_2$O$_3$), clay ($Al_2O_3.2SiO_2$), kaoline ($Al_2O_3.2SiO_2.2H_2O$), calcium silicate (Ca$_2$.SiO$_4$, etc.), aluminum calcium silicate ($Al_2O_3.CaO.2SiO_2$, etc.), calcium magnesium silicate (CaMgSiO$_4$), calcium carbonate (CaCO$_3$), zirconium oxide (ZrO$_2$), zirconium hydroxide [ZrO(OH)$_2$nH$_2$O], zirconium carbonate [Zr(CO$_3$)$_2$] and crystalline alumino silicate. If the carbon black and the inorganic filler are mixed and used, the mixing weight ratio may be 95:5 to 5:95 in consideration of the improving effects of performance.

The rubber composition may be, for example, sulfur crosslinkable, and so may further include a vulcanizing agent. The vulcanizing agent may be particularly a sulfur powder and may be included in an amount of 0.1 to 10 parts by weight based on 100 parts by weight of the rubber component. With the amount used in the above range, elasticity and strength required for a vulcanized rubber composition may be secured, and at the same time, a low fuel consumption ratio may be attained.

The rubber composition may further include various additives used in a common rubber industry in addition to the above components, particularly, a vulcanization accelerator, a process oil, a plasticizer, an antiaging agent, a scorch preventing agent, a zinc white, stearic acid, a thermosetting resin, or a thermoplastic resin. The vulcanization accelerator may particularly include thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG). The vulcanization accelerator may be included in an amount of 0.1 to 5 parts by weight based on 100 parts by weight of the rubber component.

The process oil acts as a softener in a rubber composition and may particularly include a paraffin-based, naphthene-based, or aromatic compound. More particularly, an aromatic process oil may be used in consideration of tensile strength and abrasion resistance, and a naphthene-based or paraffin-based process oil may be used in consideration of hysteresis loss and properties at low temperature. The process oil may be included in an amount of 100 parts by weight or less based on 100 parts by weight of the rubber component. With the above-described amount in the range, the deterioration of tensile strength and low exothermic properties (low fuel consumption ratio) of a vulcanized rubber may be prevented.

The antiaging agent may particularly include a condensate of amines and ketones at a high temperature, such as N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, and poly-2,2,4-trimethyl-1,2-dihydroquinoline (TMDQ). The antiaging agent may be used in an amount of 0.1 to 6 parts by weight based on 100 parts by weight of the rubber component.

The rubber composition may be obtained by mulling using a mulling apparatus such as a banbury mixer, a roll, and an internal mixer according to a mixing prescription. In addition, a rubber composition having low exothermic properties and excellent abrasion resistance may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a dustproof rubber, a belt conveyor, and a hose.

BEST MODE FOR CARRYING OUT THE INVENTION

Hereinafter, the present invention will be explained in particular referring to embodiments. However, the following embodiments are only for the illustration of the present invention, and the scope of the present invention is not limited thereto.

PREPARATION EXAMPLES

Preparation Example 1: Catalyst Composition 1

Into a hexane solution under nitrogen conditions, a neodymium carboxylate compound was added, and diisobutylaluminum hydride (DIBAH) and diethylaluminum chloride (DEAC) were injected one by one such that a molar ratio of neodymium compound:DIBAH:DEAC=1:9-10:2-3 and mixed to prepare a catalyst composition. The catalyst composition thus prepared was instantly used or used after storing at −30 to 20° C. under nitrogen conditions.

Preparation Example 2: Catalyst Composition 2

A pre-alkylated neodymium carboxylate compound purchased from COMAR Chemical Co., Ltd. was used.

Preparation Example 3: Preparation of ethyl 1-(trimethylsilyl)piperidine-4-carboxylate To a solution of 2 g of ethyl piperidine-4-carboxylate dissolved in dichloromethane (CH$_2$Cl$_2$), 1.77 ml of triethylamine (Et$_3$N) and 1.62 ml of trimethylsilyl chloride (TMSCl) were added at 0° C., and the reaction mixture was stirred for 5 hours at 0° C. Then, solvents in the produced solution were evaporated under a reduced pressure, and the remaining product was re-dissolved in hexane and filtered to obtain a compound of the structure below. $^1$H nuclear magnetic resonance spectroscopic spectrum was observed.

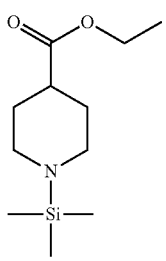

$^1$H NMR (500 MHz, CDCl$_3$) δ 4.11-4.08 (m, 2H), δ 3.13-3.11 (m, 2H), δ 2.61-2.54 (m, 2H), δ 2.34-2.32 (m, 1H), δ 1.74 (m, 2H), δ 1.42 (m, 2H), δ 1.23-1.22 (m, 3H), δ 0.05-0.00 (m, 9H).

Preparation Example 4: Preparation of ethyl 1-(trimethylsilyl)piperidine-3-carboxylate To a solution of 2 g of ethyl piperidine-3-carboxylate dissolved in dichloromethane (CH$_2$Cl$_2$), 1.77 ml of triethylamine (Et$_3$N) and 1.62 ml of trimethylsilyl chloride (TMSCl) were added at 0° C., and the reaction mixture was stirred for 3 hours at 0° C. Then, volatile solvents were removed under a reduced pressure, and the residue was filtered twice using hexane. The filtered crude material was separated via distillation under a reduced pressure to obtain a compound of the structure below. $^1$H nuclear magnetic resonance spectroscopic spectrum was observed.

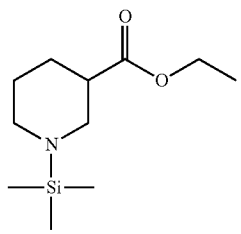

$^1$H NMR (500 MHz, CDCl$_3$) δ 4.10-4.09 (m, 2H), δ 3.19-3.17 (m, 1H), δ 2.93 (m, 1H), δ 2.79-2.72 (m, 1H), δ 2.54 (m, 1H), δ 2.24 (m, 1H), δ 1.94-1.92 (m, 1H), δ 1.63-1.58 (m, 2H), δ 1.28-1.21 (m, 4H), δ 0.00 (m, 9H).

EXAMPLES

Example 1: Preparation of Modified and Conjugated Diene-Based Polymer

<Preparation of Butadiene Polymer>
To a completely dried reactor, vacuum and nitrogen were alternately applied, and to the reactor in a vacuum state, 4.7 kg of a mixture solution of 1,3-butadiene/hexane was injected and Catalyst Composition 1 of Preparation Example 1 was added. Then, polymerization reaction was performed at 60 to 90° C. for 15 to 60 minutes to prepare a butadiene polymer including a terminal activated aluminum part.
<Modification Reaction>
After finishing the polymerization reaction of 1,3-butadiene, a hexane solution including the modifier (1-10 eq. based on catalyst) prepared in Preparation Example 3 was added to a polybutadiene polymerization solution including an aluminum part activated from the catalyst composition, and then was reacted for 30 to 60 minutes under the same temperature conditions as the polymerization conditions. Then, a hexane solution including a polymerization terminator was injected to terminate the reaction, and a hexane solution including an antioxidant was injected to prepare a modified butadiene-based polymer.

Example 2: Preparation of Modified and Conjugated Diene-Based Polymer

A modified and conjugated diene-based polymer was prepared by the same method as Example 1 except for using Catalyst Composition 2 of Preparation Example 2 as a catalyst composition during preparing a butadiene polymer and using the modifier prepared in Preparation Example 4 as a modifier during modification reaction.

Comparative Example 1

BR1208 (manufacturer, LG Chem, Ltd.) was used as unmodified Nd-BR.

Comparative Example 2

CB24 (manufacturer, Lanxess Co.) was used as unmodified Nd-BR.

EXPERIMENTAL EXAMPLES

Experimental Example 1

For the polymers before modification and the polymers after modification in Examples 1 and 2, and the polymers of Comparative Examples 1 and 2, modification or unmodification state, a number average molecular weight (Mn), a weight average molecular weight (Mw), molecular weight distribution (MWD), mooney viscosity (MV) and solution viscosity were measured, respectively.
  Number average molecular weight (Mn, X10$^5$ g/mol), weight average molecular weight (Mw, X10$^5$ g/mol), and molecular weight distribution (MWD): measured using gel permeation chromatography for each of the polymers.
  Mooney viscosity (MV) (ML1+4, @100° C. and −S/R) (MU): measured by using MV-2000E of Monsanto Co., Ltd. at 100° C. using Large Rotor at a rotor speed of 2±0.02 rpm. In this case, a specimen used was stood at room temperature (23±3° C.) for 30 minutes or more, and 27±3 g of the specimen was collected and put in a die cavity, and then, Platen was operated and mooney viscosity was measured while applying torque.
  In addition, during measuring the mooney viscosity, the change of the mooney viscosity shown with the release of the torque was observed, and a−S/R value was determined from the gradient value thereof.
  Solution viscosity (MU): viscosity of a polymer in 5 wt % toluene was measured at 20° C.

TABLE 1

|  | Example | | Comparative Example | |
|---|---|---|---|---|
| Division | 1 | 2 | 1 | 2 |
| Catalyst Composition | Preparation Example 1 | Preparation Example 2 | — | — |
| Modifier | Preparation Example 3 | Preparation Example 4 | — | — |

TABLE 1-continued

|  | Division | Example 1 | Example 2 | Comparative Example 1 | Comparative Example 2 |
|---|---|---|---|---|---|
| Before modification | Mn | 2.66 | 2.62 | 1.57 | 2.56 |
|  | Mw | 6.68 | 7.77 | 7.78 | 6.08 |
|  | Mw/Mn | 2.57 | 2.96 | 4.96 | 2.37 |
|  | ML1 + 4 | — | — | 45 | 45 |
|  | -S/R | — | — | 0.7274 | 0.5997 |
| After modification | Mn | 2.49 | 2.64 | — | — |
|  | Mw | 6.94 | 7.88 | — | — |
|  | Mw/Mn | 2.78 | 2.99 | — | — |
|  | ML1 + 4 | 47 | 52 | — | — |
|  | -S/R | 0.8215 | 0.9863 | — | — |
|  | Solution viscosity | 274 | 341 | N/A | 151 |

In Table 1, N/A means unmeasurable.

As shown in Table 1, for the cases of Examples 1 and 2, which were prepared according to the present invention, it was found that the mooney viscosity and the weight average molecular weight were increased and the molecular weight distribution was increased after modification.

Experimental Example 2

With respect to 100 parts by weight of the modifier or unmodified conjugated diene-based polymer of Example 1 or 2, or Comparative Example 1 or 2, 70 parts by weight of graphite, 22.5 parts by weight of a process oil, 2 parts by weight of an antiaging agent (TMDQ), 3 parts by weight of zinc white (ZnO), and 2 parts by weight of stearic acid were mixed to prepare a rubber mixture. To the rubber mixture thus prepared, 2 parts by weight of a sulfur powder, 2 parts by weight of a vulcanization accelerator (CZ) and 0.5 parts by weight of a vulcanization accelerator (DPG) were added, followed by vulcanizing at 160° C. for 25 minutes to manufacture a rubber specimen. With respect to the rubber specimen thus manufactured, tensile properties, viscoelasticity and abrasion resistance were evaluated.

In detail, with respect to the rubber specimen thus manufactured, modulus when elongated by 300% (300% modulus (M-300%), kgf/cm²), tensile strength (kgf/cm²) of a vulcanized material, and elongation (%) of a vulcanized material when broken were measured after vulcanizing at 150° C. for t90 minutes according to ASTM D412. In addition, each measured value was indexed with respect to the measured value of Comparative Example 2 of 100.

In addition, with respect to the rubber specimen, viscoelasticity coefficient (tan δ) at 60° C. was measured with a frequency of 10 Hz and a deformation rate of 3%. In addition, each measured value was indexed with respect to the measured value of Comparative Example 2 of 100.

In addition, with respect to the rubber specimen, DIN abrasion test was conducted according to ASTM D5963 and DIN wt loss index (loss volume index: abrasion resistance index, Method A (ARI$_A$)) is shown together. The higher the index is, the better the abrasion resistance is.

TABLE 2

|  | Example | | Comparative Example | |
|---|---|---|---|---|
| Division | 1 | 2 | 1 | 2 |
| Modifier | Preparation Example 3 | Preparation Example 4 | — | — |
| M-300% | 100 | 98 | 83 | 97 |
| M-300% index | 104 | 101 | 86 | 100 |
| T/S | 184 | 182 | 166 | 177 |
| T/S index | 104 | 103 | 94 | 100 |
| Elongation | 485 | 491 | 523 | 484 |
| Elongation index | 100 | 101 | 108 | 100 |
| Tan δ @60° C. | 0.138 | 0.140 | — | 0.149 |
| Tan δ @60° C. index | 108 | 106 | 83 | 100 |
| DIN wt loss index | 106 | 99 | — | 100 |

As shown in Table 2, different from Comparative Example 1 which shows degraded modulus when elongated by 300%, tensile strength and viscoelasticity except for elongation when compared to Comparative Example 2, it was found for Examples 1 and 2 in which modification using a modifier according to the present invention was conducted, that all of modulus when elongated by 300%, tensile strength, and tensile properties and viscoelasticity of elongation were excellent and further, it was found that abrasion resistance was maintained to the same level as Comparative Example 2 or improved.

The invention claimed is:

1. A modified and conjugated diene-based polymer, comprising a functional group derived from a modifier, wherein the modifier comprises a compound represented by Formula 1:

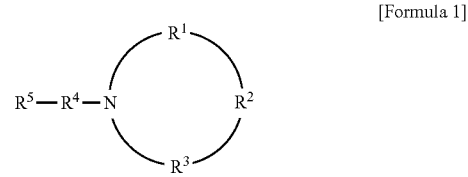

[Formula 1]

wherein, $R^1$ to $R^3$ are each independently a trivalent hydrocarbon group which is substituted with at least one substituent selected from the group consisting of a halogen group, an alkyl group of 1 to 20 carbon atoms, a cycloalkyl group of 3 to 20 carbon atoms, an aryl group of 6 to 30 carbon atoms, and —$R^6COOR^7$; or an unsubstituted divalent hydrocarbon group of 1 to 10 carbon atoms, wherein all $R^1$ to $R^3$ are not the trivalent hydrocarbon group; or the divalent hydrocarbon group, at the same time, $R^4$ is a single bond, an alkylene group of 1 to 20 carbon atoms, or a cycloalkylene group of 3 to 20 carbon atoms, $R^5$ is a silyl group which is unsubstituted or substituted with an alkyl group of 1 to 20 carbon atoms; halogen; a cyano group; or —$COR^8$, $R^6$ is a single bond, an alkylene group of 1 to 20 carbon atoms, or a cycloalkylene group of 3 to 20 carbon atoms, $R^7$ is an alkyl group of 1 to 20 carbon atoms, or a cycloalkyl group of 3 to 20 carbon atoms, and $R^8$ is one selected from the group consisting of an alkoxy group of 1 to 10 carbon atoms, an aryl group of 6 to 30 carbon atoms, a heteroaryl group of 2 to 30 carbon atoms, a heterocycloalkyl group of 2 to 10 carbon atoms, a heteroamine group of 2 to 10 carbon atoms, and a disilylamino group of 3 to 10 carbon atoms.

2. The modified and conjugated diene-based polymer of claim 1, wherein the modified and conjugated diene-based polymer has molecular weight distribution of 2.0 to 3.5.

3. The modified and conjugated diene-based polymer of claim 1, wherein the modified and conjugated diene-based polymer has a mooney viscosity (MV) of 20 to 70 at 100° C.

4. A method for preparing a modified and conjugated diene-based polymer, the method comprising:
a modification step of reacting a conjugated diene-based polymer comprising an organometal part activated from a lanthanide series rare earth element catalyst composition with a modifier comprising a compound represented by Formula 1:

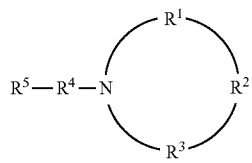

[Formula 1]

wherein,
$R^1$ to $R^3$ are each independently a trivalent hydrocarbon group which is substituted with at least one substituent selected from the group consisting of a halogen group, an alkyl group of 1 to 20 carbon atoms, a cycloalkyl group of 3 to 20 carbon groups, an aryl group of 6 to 30 carbon atoms, and —$R^6COOR^7$; or an unsubstituted divalent hydrocarbon group of 1 to 10 carbon atoms,
wherein all $R^1$ to $R^3$ are not the trivalent hydrocarbon group; or the divalent hydrocarbon group, at the same time,
$R^4$ is a single bond, an alkylene group of 1 to 20 carbon atoms, or a cycloalkylene group of 3 to 20 carbon atoms,
$R^5$ is a silyl group which is unsubstituted or substituted with an alkyl group of 1 to 20 carbon atoms; halogen; a cyano group; or —$COR^8$,
$R^6$ is a single bond, an alkylene group of 1 to 20 carbon atoms, or a cycloalkylene group of 3 to 20 carbon atoms,
$R^7$ is an alkyl group of 1 to 20 carbon atoms, or a cycloalkyl group of 3 to 20 carbon atoms, and
$R^8$ is one selected from the group consisting of an alkoxy group of 1 to 10 carbon atoms, an aryl group of 6 to 30 carbon atoms, a heteroaryl group of 2 to 30 carbon atoms, a heterocycloalkyl group of 2 to 10 carbon atoms, a heteroamine group of 2 to 10 carbon atoms, and a disilylamino group of 3 to 10 carbon atoms.

5. The method for preparing a modified and conjugated diene-based polymer of claim 4, further comprising prior to the modification step, a step of performing polymerization reaction of a conjugated diene-based monomer using a catalyst composition comprising a lanthanide series rare earth element-containing compound in a polymerization solvent to prepare a conjugated diene-based polymer having an activated organometal part.

6. The method for preparing a modified and conjugated diene-based polymer of claim 5, wherein the catalyst composition comprises the lanthanide series rare earth element-containing compound, an alkylating agent and a halogen compound.

7. The method for preparing a modified and conjugated diene-based polymer of claim 5, wherein the lanthanide series rare earth element-containing compound comprises a neodymium compound represented by Formula 3:

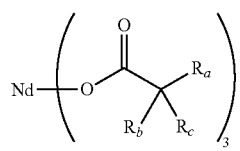

[Formula 3]

wherein,
$R_a$ to $R_c$ are each independently hydrogen, or an alkyl group of 1 to 12 carbon atoms,
wherein all $R_a$ to $R_c$ are not hydrogen, at the same time.

8. The method for preparing a modified and conjugated diene-based polymer of claim 5, wherein the catalyst composition further comprises a conjugated diene-based monomer.

9. The method for preparing a modified and conjugated diene-based polymer of claim 4, wherein the conjugated diene-based polymer comprising the activated organometal part is a conjugated diene-based polymer comprising a terminal activated organometal part.

10. The method for preparing a modified and conjugated diene-based polymer of claim 4, wherein the conjugated diene-based polymer comprising the activated organometal part is a neodymium catalyzed butadiene-based polymer comprising a repeating unit derived from an 1,3-butadiene monomer.

11. The modified and conjugated diene-based polymer of claim 1, wherein
in the Formula 1,
$R^1$ to $R^3$ are each independently a trivalent hydrocarbon group which is substituted with —$R^6COOR^7$; or an unsubstituted divalent hydrocarbon group of 1 to 10 carbon atoms,
wherein all $R^1$ to $R^3$ are not the trivalent hydrocarbon group; or the divalent hydrocarbon group, at the same time,
$R^4$ is a single bond, or an alkylene group of 1 to 20 carbon atoms,
$R^5$ is a silyl group which is substituted with an alkyl group of 1 to 20 carbon atoms; halogen; a cyano group; or —$COR^8$,
$R^6$ is a single bond,
$R^7$ is an alkyl group of 1 to 20 carbon atoms, and
$R^8$ is one selected from the group consisting of an alkoxy group of 1 to 10 carbon atoms, an aryl group of 6 to 30 carbon atoms, a heteroaryl group of 2 to 30 carbon atoms, a heterocycloalkyl group of 2 to 10 carbon atoms, a heteroamine group of 2 to 10 carbon atoms, and a disilylamino group of 3 to 10 carbon atoms.

12. The modified and conjugated diene-based polymer of claim 1, wherein the compound represented by Formula 1 is a compound represented by Formula 2:

[Formula 2]

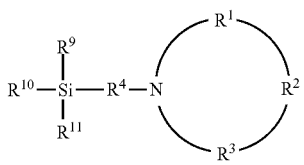

wherein,

R[1] and R[3] are each independently a trivalent hydrocarbon group which is substituted with at least one substituent selected from the group consisting of a halogen group, an alkyl group of 1 to 20 carbon atoms, a cycloalkyl group of 3 to 20 carbon atoms, and an aryl group of 6 to 30 carbon atoms; or an unsubstituted divalent hydrocarbon group of 1 to 10 carbon atoms, R[2] is a trivalent hydrocarbon group which is substituted with —R[6]COOR[7], R[4] and R[6] are single bonds, R[7] is an alkyl group of 1 to 20 carbon atoms, or a cycloalkyl group of 3 to 20 carbon atoms, and R[9] to R[11] are each independently hydrogen, or an alkyl group of 1 to 20 carbon atoms.

13. The modified and conjugated diene-based polymer of claim 1, wherein the compound represented by Formula 1 is one selected from the group consisting of the compounds represented by Formulae 2-1 to 2-3:

[Formula 2-1]

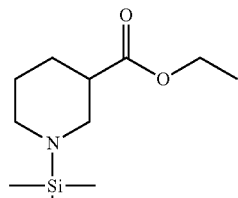

[Formula 2-2]

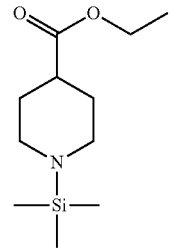

[Formula 2-3]

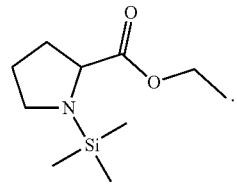

* * * * *